(12) United States Patent
Fairburn et al.

(10) Patent No.: US 6,692,066 B2
(45) Date of Patent: Feb. 17, 2004

(54) AIR CHANNELER FOR REDUCING WIND RESISTANCE AND METHOD OF USE

(75) Inventors: Douglas S. Fairburn, Ft. Worth, TX (US); June M. Fairburn, Ft. Worth, TX (US); Julian P. Jadlowski, Ft. Worth, TX (US)

(73) Assignee: Vacuum Breaker Mile Maker, Ft. Worth, TX (US)

( * ) Notice: Subject to any disclaimer, the term of this patent is extended or adjusted under 35 U.S.C. 154(b) by 0 days.

(21) Appl. No.: 10/422,019

(22) Filed: Apr. 23, 2003

(65) Prior Publication Data

US 2003/0193216 A1 Oct. 16, 2003

Related U.S. Application Data

(62) Division of application No. 09/935,448, filed on Aug. 23, 2001, now Pat. No. 6,561,575.

(51) Int. Cl.[7] .................................................. B60J 7/00
(52) U.S. Cl. ...................... 296/208; 296/180.1; 296/91; 180/68.1; 180/165
(58) Field of Search ................................. 296/208, 194, 296/195, 180.1, 91, 180.2; 180/68.1, 165

(56) References Cited

U.S. PATENT DOCUMENTS

| | | |
|---|---|---|
| 1,871,396 A | 8/1932 | Stalker |
| 1,923,349 A | 8/1933 | Wolverton |
| 2,514,695 A | 7/1950 | Dempsey |
| 2,569,983 A | 10/1951 | Favre |
| 2,725,944 A | 12/1955 | Lee et al. |
| 2,886,120 A | 5/1959 | Broell |
| 3,791,468 A | 2/1974 | Bryan, Jr. |
| 3,807,787 A | 4/1974 | Gotz |
| 3,910,623 A | 10/1975 | McKeen |
| 3,971,586 A | 7/1976 | Saunders |
| 4,227,662 A | 10/1980 | Fisher et al. |
| 4,257,640 A | 3/1981 | Wiley |
| 4,257,641 A | 3/1981 | Keedy |
| 4,320,920 A | 3/1982 | Goudey |
| 4,357,045 A | 11/1982 | Kinford, Jr. |
| 4,379,582 A | 4/1983 | Miwa |
| 4,423,368 A | 12/1983 | Bussiere |
| 4,457,552 A | 7/1984 | Katsuoka |
| 4,460,055 A | 7/1984 | Steiner |
| 4,682,808 A | 7/1987 | Bilanin |
| 4,690,204 A | 9/1987 | Reichel et al. |
| 4,709,774 A | 12/1987 | Saito et al. |
| 4,838,603 A | 6/1989 | Masoero et al. |
| 5,054,844 A | 10/1991 | Miwa |
| 5,108,145 A | 4/1992 | Harris |
| 5,171,057 A | 12/1992 | Sharp |
| 5,234,249 A | 8/1993 | Dorrell |
| 5,280,827 A | 1/1994 | Taylor et al. |
| 5,287,004 A | 2/1994 | Finley |
| 5,498,059 A | 3/1996 | Switlik |
| 5,842,734 A | 12/1998 | Lechner |
| 5,908,217 A | 6/1999 | Englar |
| 5,927,795 A | 7/1999 | Townend |
| 6,138,781 A | 10/2000 | Hakala |

FOREIGN PATENT DOCUMENTS

| | | |
|---|---|---|
| EP | 1035006 | 9/2000 |
| EP | 1048556 | 11/2000 |

*Primary Examiner*—Kiran Patel
(74) *Attorney, Agent, or Firm*—Grady K. Bergen (57) ABSTRACT

An air channeler device is provided for use with a vehicle having a forward and rearward end for reducing wind resistance of the vehicle. The air channeler has an air inlet for positioning within an air stream surrounding the vehicle so that air is received in the inlet as the air stream moves about the vehicle. An air discharge is provided for positioning at a generally central location of the rearward end of the vehicle and has a width that is substantially less than the width of the rearward end of the body so that the air discharge is spaced inward from the edges of the rearward end. An air conduit couples to the vehicle and has a generally tubular passageway that is in communication between the air inlet and the air discharge for directing air from the air inlet through the conduit to the discharge. The air conduit may also be formed into two sections wherein one section is coupled to a movable portion of the vehicle, and wherein movement of the movable portion causes engagement and disengagement of the two sections.

17 Claims, 8 Drawing Sheets

Fig. 12

AIR CHANNELER FOR REDUCING WIND RESISTANCE AND METHOD OF USE

This application is a division of U.S. patent application Ser. No. 09/935,448, filed Aug. 23, 2001 now U.S. Pat. No. 6,561,575.

TECHNICAL FIELD

The invention relates generally to methods and devices used for reducing air resistance and drag on a body located within an air stream, and particularly to those methods and devices for reducing wind resistance and drag on moving vehicles.

BACKGROUND

When a non-streamline moving body moves through air at high speeds a low pressure area or "vacuum" usually is created behind the trailing or rearward end of the body. This is particularly true with large vehicles having a generally flat or block-shaped rearward end, such as truck trailers and the like. As a result, the moving body encounters significant aerodynamic resistance and drag.

Figure 1:
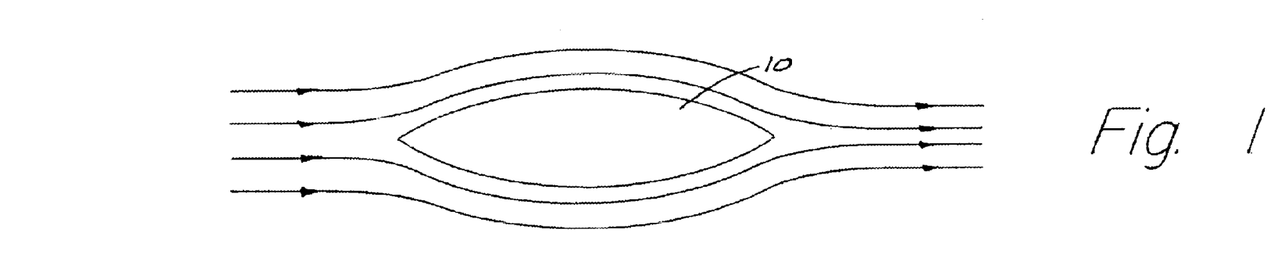
FIG. 1 illustrates air flow about a streamlined body.
Figure 2:
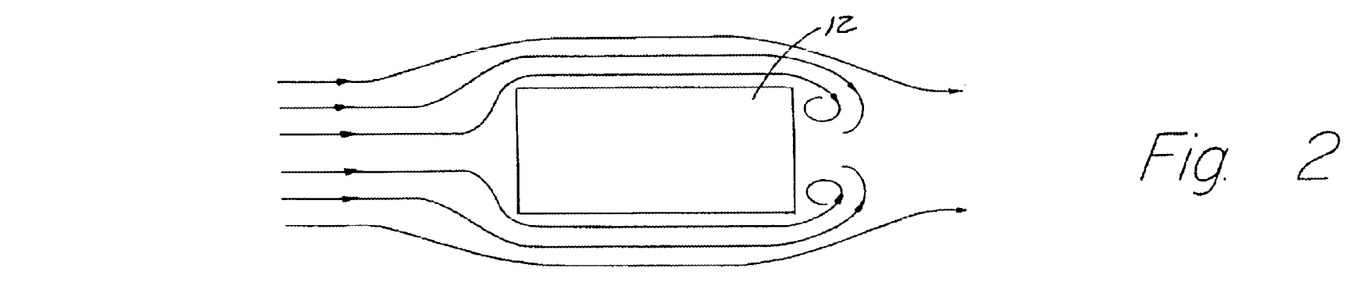
FIG. 2 illustrates air flow about a non-streamlined body.

As can be seen in FIG. 1, which shows a streamline or aerodynamic body 10 located within an air stream (as indicated by the arrows), there is very little air compression at the front of the body 10 and very little vacuum at the rear of the body 10 as air passes smoothly about the outer surfaces of the body 10. Thus, the body 10 moves through the air easily and with little aerodynamic resistance. In contrast, FIG. 2 shows a non-streamline body 12 with large, flat front and rear surfaces. As air encounters the body 12, a high degree of air compression is observed at the forward end of the body 12, with a significant vacuum being created at the rearward end of the body 12. Air rushes into the area of the vacuum to the rear of the body 12 creating turbulent air or vortices that increase the drag of body 12.

This effect is a particular problem with large and bulky wheeled vehicles, such as those used for transporting cargo where streamlined or aerodynamic designs are impractical. Such vehicles commonly include many trucks, tractor-trailers, buses, vans, RV's, locomotives, railcars, and the like. Because of their design and large size, a significant amount of drag and air resistance is produced. Additionally, such vehicles usually travel over long distances where even the smallest reduction in drag and air resistance can result in a significant reduction in costly fuel consumption.

There are numerous methods that have been tried in the past to reduce drag in moving vehicles. And while much work has been done on improving the aerodynamics of the front end of vehicles, there has been less emphasis on improving the rearward or load carrying end, the design of which is oftentimes limited by cargo requirements. Those designs that do exist, however, are often cumbersome and can interfere with the normal operation and use of the vehicle, such as when opening and closing doors or accessing the cargo space of the vehicle, thereby making their use impractical. Many, if not most, of these methods require the use of an airfoil or air-deflecting surface for directing air inwardly from the rearward sides of the vehicle to disrupt the trailing vortical air flow. Other methods call for improving the aerodynamic design of the vehicle, such as that disclosed in U.S. Pat. No. 4,257,641.

Improvements are therefore needed for reducing drag and aerodynamic resistance in such vehicles without interfering with the normal use and operation of the vehicle and which provide a cost effective and easily implemented means for doing so.

SUMMARY

An air channeler device is provided for use with a body having a forward and rearward end and located in an air stream for reducing wind resistance of the body. The air channeler has an air inlet for positioning within an air stream surrounding the body so that air is received in the inlet as the air stream moves about the body. An air discharge is provided for positioning at a generally central location of the rearward end of the body and has a width that is substantially less than the width of the rearward end of the body so that the air discharge is spaced inward from the edges of the rearward end. An air conduit couples to the body and has a generally tubular passageway that is in communication between the air inlet and the air discharge for directing air from the air inlet through the conduit to the discharge.

In more specific embodiments, the air conduit is formed in at least two sections that are releasably joined together so that the at least two sections can be engaged and disengaged from one another. One of the at least two sections may also be adapted for coupling to a movable portion of the body, which is movable between first and second positions, and wherein movement of the movable portion between the first and second positions causes engagement and disengagement of the at least two sections. A seal may also be joined to at least one of the two sections of the air conduit for providing sealing engagement of the two sections of the air conduit when engaged with one another.

In other embodiments, various features may be included. For instance, an air damper can be provided that is movable between open and closed positions for selectively closing off the air conduit to prevent air flow through the passageway. The width of the air discharge may be substantially less than the distance of the air discharge from the side edges of the rearward end of the body. The air discharge can be about 12 inches or less. The air inlet and air discharge may include opposite ends of the air conduit. Further, a coupling device for coupling the air conduit to the vehicle may be provided.

The air channeler device can also be provided in a vehicle having a forward end and a rearward end for reducing wind resistance of the vehicle. The device has an air inlet for positioning within an air stream surrounding the vehicle so that air is received in the inlet as the vehicle is moved in a forward direction. An air discharge located at a generally central location of the rearward end of the vehicle and having a width that is substantially less than the width of the rearward end of the vehicle is provided so that the air discharge is spaced inward from the edges of the rearward end. An air conduit is mounted to the vehicle and has a generally tubular passageway that is in communication between the air inlet and the air discharge for directing air from the air inlet through the conduit to the discharge.

In still another embodiment, an air channeler device for use with a vehicle having a forward and rearward end is provided for reducing wind resistance of the vehicle. The device has an air inlet for positioning within an air stream surrounding the vehicle so that air is received in the inlet as the vehicle is moved in a forward direction. An air discharge for positioning at the rearward end of the vehicle is also provided. An air conduit is coupled to the vehicle and has a generally tubular passageway that is in communication between the air inlet and the air discharge for directing air from the air inlet through the conduit to the discharge. The air conduit is formed in at least two sections that are releasably joined together so that the at least two sections can be engaged and disengaged from one another. One of the at least two sections is adapted to be mounted to a movable portion of the vehicle that is movable between first and second positions and wherein movement of the movable portion between the first and second positions causes engagement and disengagement of the at least two sections.

A method of reducing wind resistance of a body having a forward end and a rearward end that is located in air stream is also achieved by positioning an air inlet within an air stream surrounding the body so that air is received in the inlet as the air stream moves about the body. An air discharge is provided at a generally central location of the rearward end of the body. The air discharge has a width that is substantially less than the width of the rearward end of the body so that the air discharge is spaced inward from the edges of the rearward end. Air is allowed to pass through an air conduit having a generally tubular passageway that is in communication between the air inlet and the air discharge so that air is directed from the air inlet through the conduit to the discharge.

A method of selectively reducing wind resistance and slowing a moving vehicle having a forward end and a rearward end is also provided. The method comprises positioning an air inlet within an air stream surrounding the vehicle so that air is received in the inlet as the vehicle is moved in a forward direction. An air discharge is provided at a generally central location of the rearward end of the vehicle. The air discharge has a width that is substantially less than the width of the rearward end of the vehicle so that the air discharge is spaced inward from the edges of the rearward end. By selectively allowing air to pass through an air conduit having a generally tubular passageway that is in communication between the air inlet and the air discharge so that air is directed from the air inlet through the conduit to the discharge, wind resistance of the vehicle is reduced. Further, by restricting air flow through the passageway of the conduit, wind resistance is increased to thereby slow the vehicle.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 3:
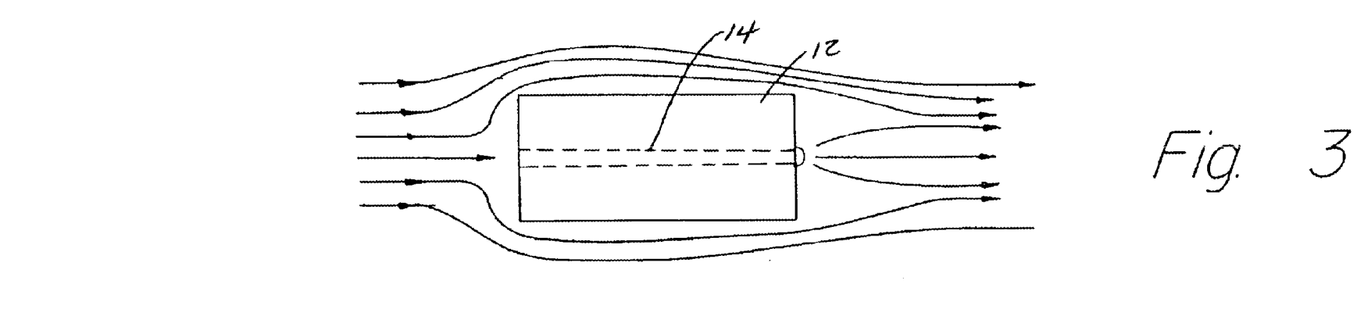
FIG. 3 is a diagram illustrating air flow about a non-streamlined body, wherein the body has an air conduit that passes through the center of the body.

Because of the problems associated with drag and wind resistance of vehicles having bulky and non-streamline configurations, an air channeling device is provided to reduce the amount of drag and wind resistance these vehicles encounter. As can be seen in FIG. 3, when the body 12 of FIG. 2 is provided with an longitudinal air conduit or tube 14 that passes generally through the center of the body 12, compressed or high pressure air from the forward end of the body 12 passes through the conduit 14 and exits at the rearward end of the vehicle. This breaks the "vacuum" located at the rear of the body 12 and reduces the turbulent or vortical air that otherwise would result, thus allowing the body 12 to move through the air with less drag and air resistance.

Figure 4:
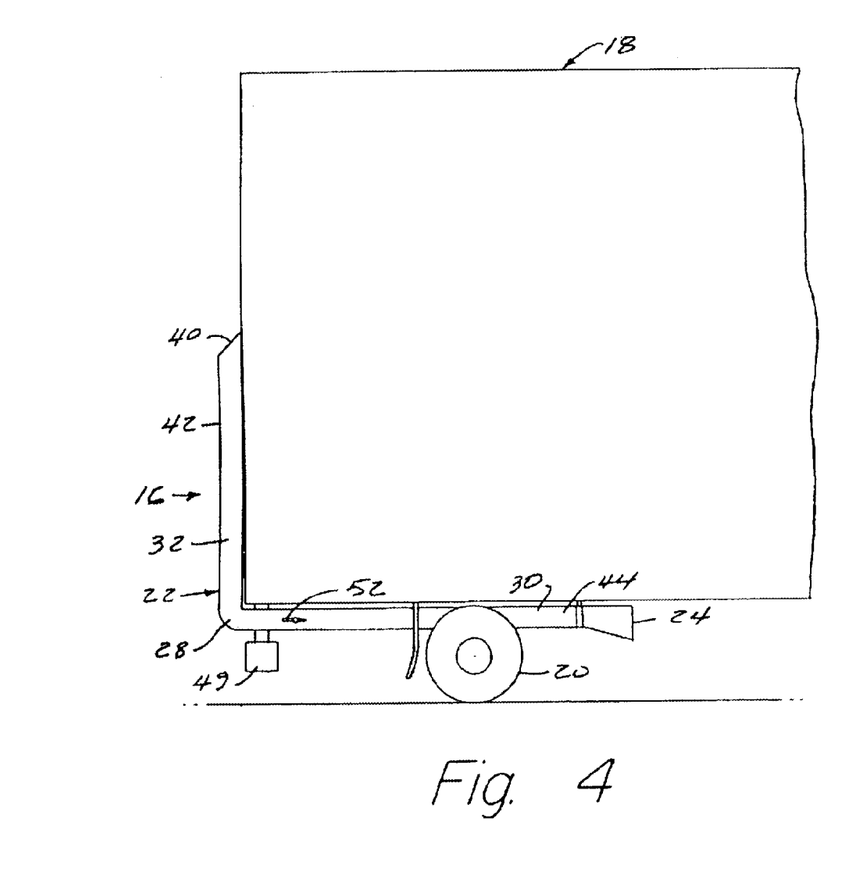
FIG. 4 is a side elevational view of a truck trailer incorporating an air channeler device of the invention, and constructed in accordance therewith.
Figure 5:
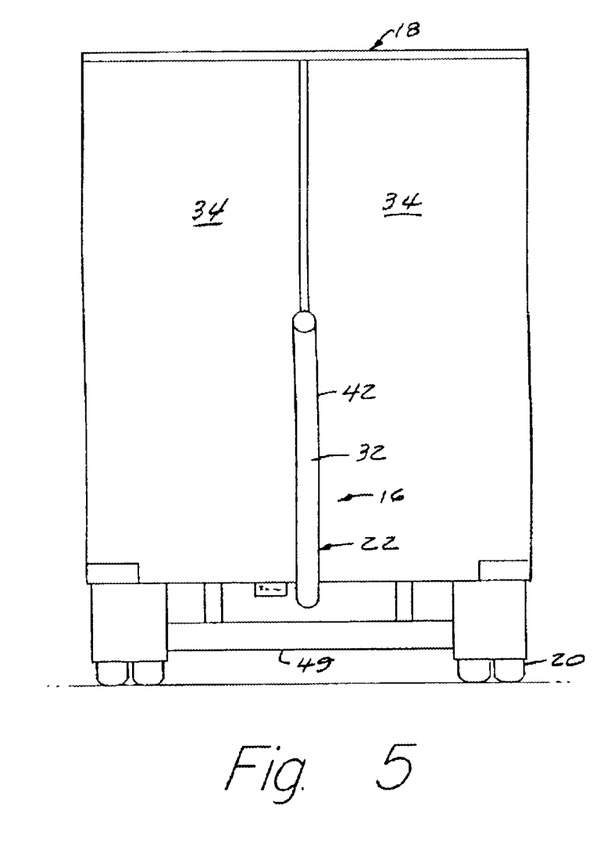
FIG. 5 is a rear elevational view of the truck trailer of FIG. 4.

Having a longitudinal tube running through the center of a vehicle, however, would be impractical in most cases and would interfere with the normal operation of most vehicles. In order to incorporate those benefits provided by such a conduit to a vehicle, an air channeler device 16 is provided, as shown in FIGS. 4 and 5. It should be noted that as used herein, the term "vehicle" can include any wheeled body used for carrying passengers or cargo, such as automobiles, trucks, trailers, buses, vans, RV's, locomotives, railcars, and the like, and whether or not such bodies are self propelled or require other means for locomotion. By way of example, the air channeler 16 is mounted to a tractor trailer 18, as shown. The trailer 18 is a box-type trailer of generally conventional design that is supported at its rearward end by tires and wheels 20. The rearward end of the trailer 18 terminates in a generally flat, vertical wall or surface having a generally square or rectangular periphery.

The air channeler device 16 is formed from a generally L-shaped conduit 22, although other configurations could be used as well, having a generally tubular passageway. The conduit 22 may be formed from a lightweight plastic, metal or other suitable material. The conduit 22 may be rigid or flexible, and may be cylindrical or otherwise shaped and can vary in diameter or width, but typically will have a width of about 12 inches or less, with about 6, 5, 4 and 3 inches being typical. It should be noted that as used herein, the term "width" in reference to the conduits or air passageways discussed refers to the greatest cross-sectional dimension. At one end of the conduit 22 is an air inlet 24. While the conduit may have a uniform width or diameter along its length, the air inlet 24 may have an opening that is greater than the remaining width or diameter of the conduit 22, to facilitate the introduction of air into the inlet 24. The conduit 22 is coupled or mounted to the undercarriage of the trailer 18 by means of mounting brackets 26 (FIG. 6) or other suitable fasteners or coupling devices. In the embodiment shown, the air inlet 24 is located at a position forward of the rearward end of the trailer 18. In this case, the inlet 24 is located forward of the rear wheels 20 of the trailer 18 to minimize turbulent air flow from the wheels 20. It should be noted, however, that the air inlet 24 can be positioned anywhere where air can be received from the air stream surrounding the vehicle during travel, such as along the side surfaces of the vehicle.

Figure 6:
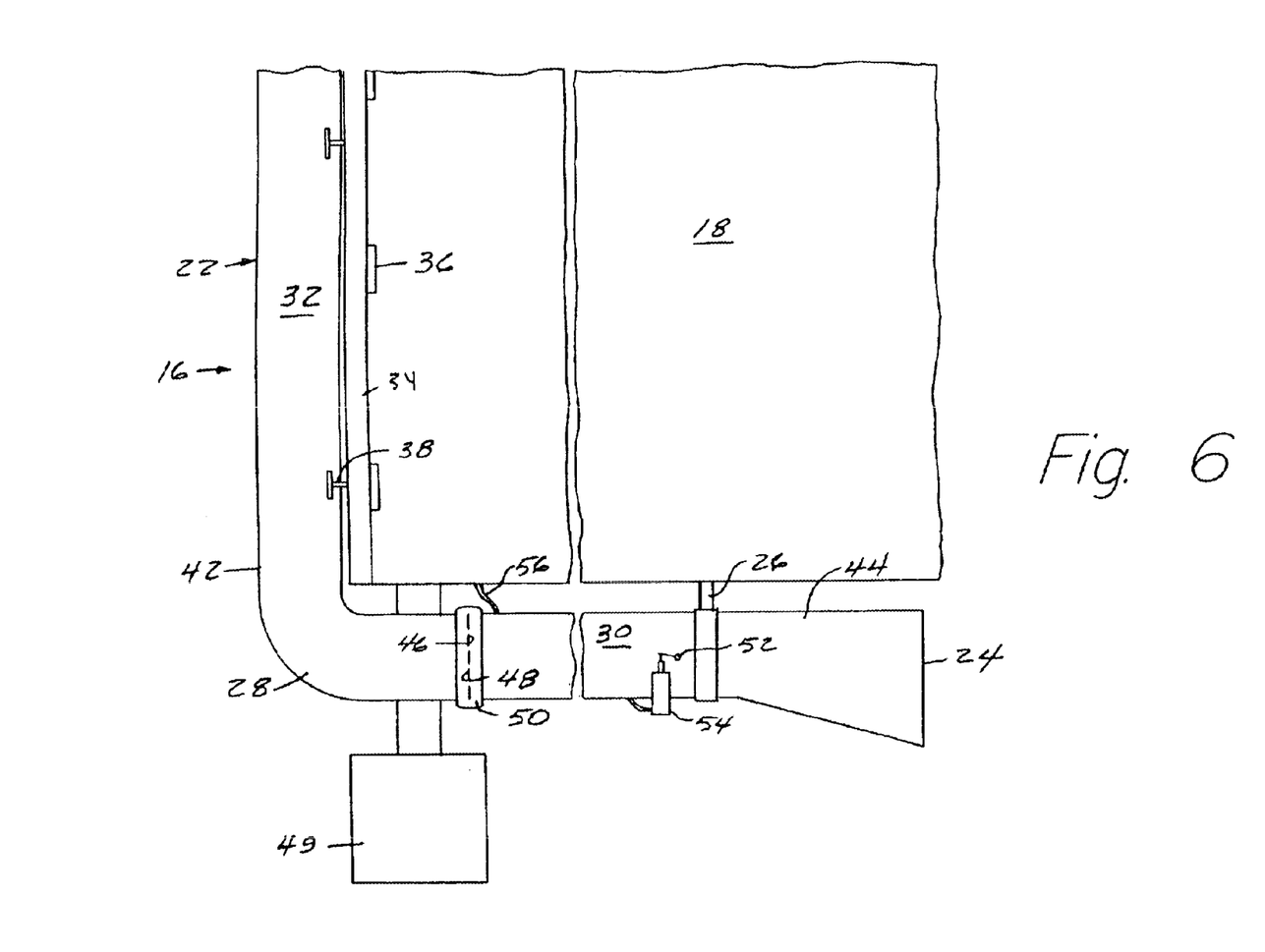
FIG. 6 is an enlarged side elevational view of the truck trailer and air channeler device of FIG. 4, showing further detail of the air channeler device.

The conduit 22 extends rearward from the inlet 24 to the rearmost edge of the trailer 18. An elbow or bend 28 is provided in the conduit 22 adjacent the rearmost edge that essentially divides the conduit into a horizontal portion 30, oriented parallel to a longitudinal axis of the trailer 18, and a vertical or upright portion 32. The upright portion 32 extends upwards adjacent to and along the rearward end wall of the trailer 18 formed by laterally swinging cargo doors 34 hinged at 36. As shown in FIG. 6, the upright portion 32 is mounted to one of the doors 34 by brackets or fasteners 38. Preferably, the upright portion 32 is located at a position so that it does not interfere with the access or operation of any door handles or locks for opening and securing the doors 34.

The upright portion 32 of the conduit 22 terminates in an air discharge 40. As can be seen in FIG. 5, the air discharge 40 is located at a generally central location of the rearward end of the trailer. Preferably, the air discharge 40 should be immediately adjacent to or as near as possible to the rearward end of the trailer 18. The air discharge 40 has a width or diameter that is substantially less than the width of the rearward end of the trailer 18 so that it is spaced inward from the edges of the rearward end of the trailer 18. Preferably, the width of the discharge 40 is substantially less than the distance of the air discharge from the side edges of the rearward end of the trailer 18. Because the discharge 40 is centrally located at the center of the rearward end of the trailer 18, air is discharged into the area of the greatest vacuum or lowest pressure. In the embodiment shown, the air discharge 40 is directed upward, however, the discharge 40 could also be oriented rearward or in other directions, as well.

Figure 7:
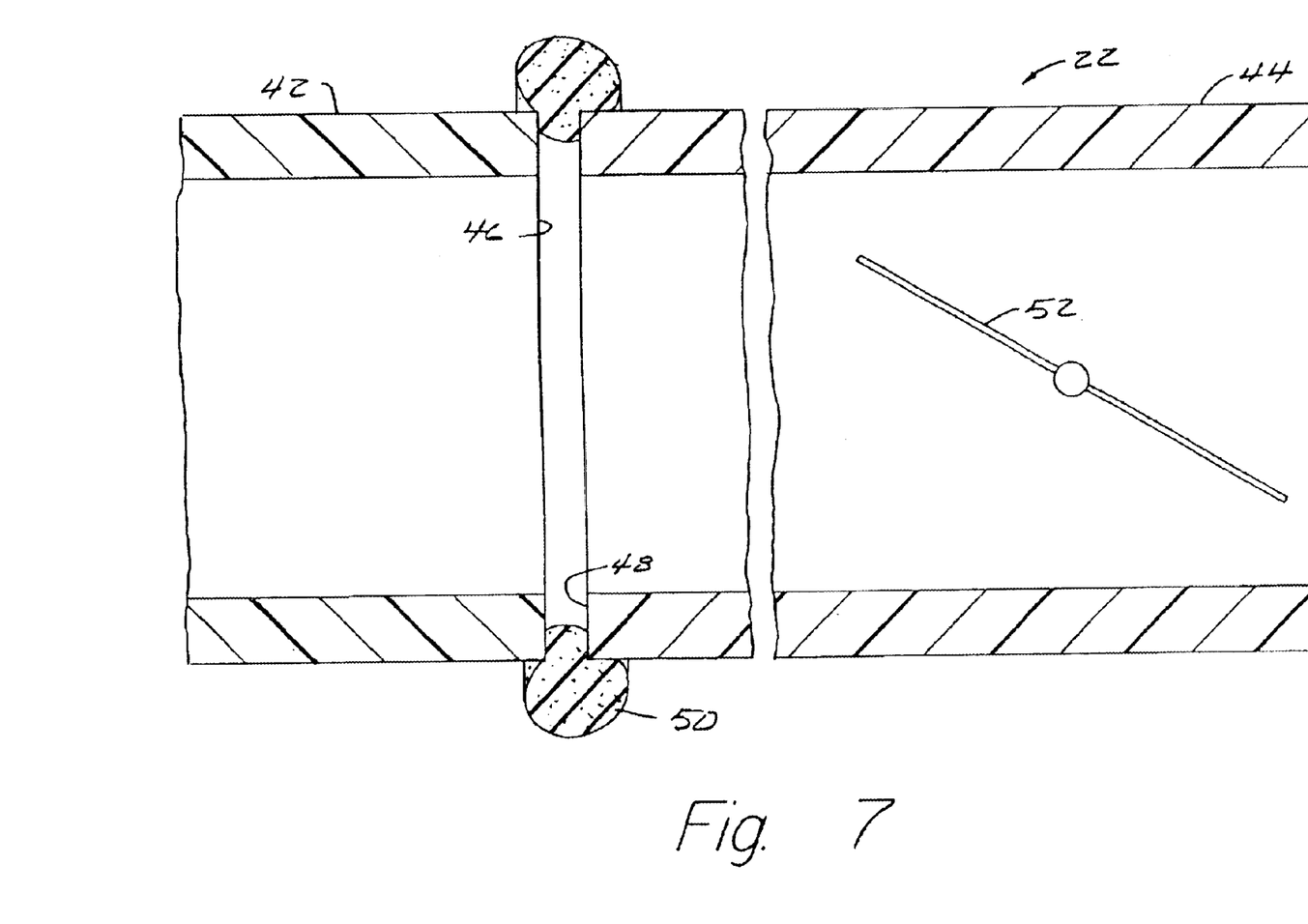
FIG. 7 is a longitudinal cross-sectional view of the air channeler device of FIG. 4.

The conduit 22 is formed into movable and stationary sections 42, 44 that releasably join together so that they can be engaged and disengaged from one another. The movable section 42 is formed from the upright portion 32 and elbow 28 of the conduit 22. A portion of the elbow 28 projects forward a distance under the trailer 18 and terminates at its forward end in lip 46 (FIG. 7). Likewise, the stationary section 44 is comprised of the horizontal portion 30 and terminates at its rearward end in lip 48, which abuts or faces lip 46 when the sections 42, 44 are engaged. The rearward end 48 of the stationary section 44 terminates at a position forward of the rearmost surface of a rear bumper 49 of the trailer 18.

A circumferential seal 50 is provided and joined to the rearward lip 48 of section 44. The seal 50 is preferably a deformable material, such as rubber, that deforms or compresses to provide a seal between the ends of the movable and stationary sections 42, 44 when they are engaged. The seal 50 may be slightly oversized to provide sealing engagement between the sections 42, 44 should the ends of the sections 42, 44 not be in precise alignment. Although, the seal 50 preferably provides an airtight seal between the sections 42, 44 when they are engaged, some loss of air can be tolerated as long as there is substantial air flow through the conduit 22.

A damper 52 is disposed within the interior of conduit 22. The damper 52 can be located anywhere along the length of the conduit 22, but is preferably located near or adjacent to the inlet 24. The damper 52 is coupled to a solenoid 54 or other actuating device for moving the damper 52 between open and closed positions for selectively closing off the air passageway formed by the conduit 22 to prevent air flow therethrough. In one preferred embodiment, the solenoid 54 is electrically coupled to the brake lights of the trailer 18, such as by wires 56, so that when the brake lights are activated during braking, the solenoid 54 is actuated to move the damper 52 to the closed position. When the brake lights are deactivated, the solenoid 54 then returns the damper 52 to its open position.

The operation of the air channeler device is as follows. When the air channeler device 16 is mounted to the trailer 18, as has been described, forward motion of the trailer 18 causes air to be introduced into the inlet 24. Air from the inlet 24 passes through the passageway formed by the conduit 22 where it is exhausted through the discharge 40 at a position near the approximate center of the rearward end of the trailer 18. At speeds where drag and aerodynamic resistance become a factor, the air discharged from air discharge disrupts the low pressure or vacuum area and the turbulent air that would otherwise be formed without the air channeler, and thereby reduces the drag of the trailer.

During braking operations, application of brakes of the trailer causes activation of the solenoid 54, which is electrically coupled to the trailer's brake lights. The solenoid causes the damper 52 to pivot to the closed position, effectively closing off the passageway formed by the conduit 22. Because air is prevented from being discharged through the air discharge 40 to disrupt the low pressure or vacuum area to the rear of the trailer, drag and aerodynamic resistance of the trailer are increased, thus facilitating slowing of the vehicle during braking operations. When the brakes are released, the damper 52 is opened by deactivation of the solenoid 54.

The air channeler device does not interfere with the normal operation and use of the trailer. Thus, to access the interior of the trailer 18, the cargo doors 34 are merely opened in a normal fashion. Because the air channeler 16 is formed into two sections, the movable section 42, which is mounted to one of the cargo doors, disengages from the stationary section 44 and is moved out of the way when the cargo door is swung open. When backing into a loading dock or otherwise, the bumper 49 protects the stationary section 44, which is located at a position forward of the rear surface of bumper 49 and out of the way.

When the cargo door 34 carrying the movable section 42 is closed, the movable section 42 engages the stationary section 44 and stays engaged as long as the door 34 remains closed. The circumferential seal 50 facilitates sealing engagement between the two sections 42, 44 and allows for slight misalignment of the two sections 42, 44.

Figure 8:
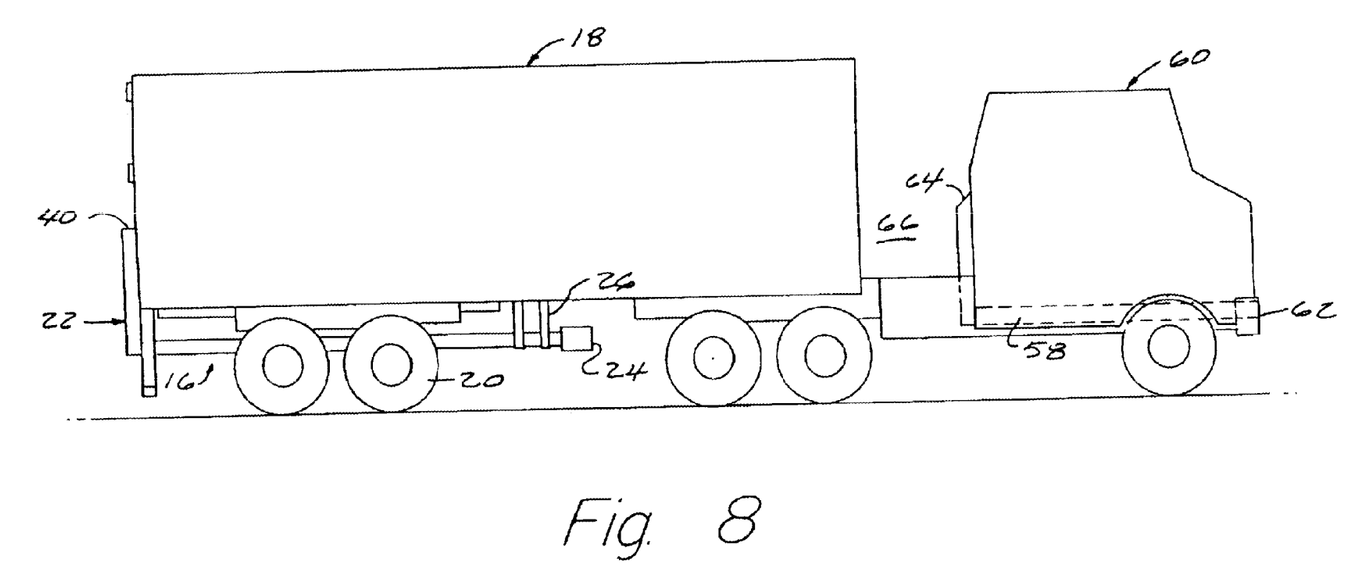
FIG. 8 is side elevational view of a tractor-trailer combination incorporating air channeling devices, and shown constructed in accordance with the invention.

Referring to FIG. 8, another embodiment is shown wherein a second air channeler device 58 is mounted to a tractor 60 for pulling the trailer 18. The device 58 is similar to the channeler device 18, however, the air inlet is located at the front of the tractor 60, in this case at or near the front bumper, and the discharge 64 is located at a position to the rear of the tractor 60. This reduces air compression at the front of tractor 60, while disrupting the low pressure area formed in the area 66 between the front of trailer 18 and rear of tractor 60.

Figure 9:
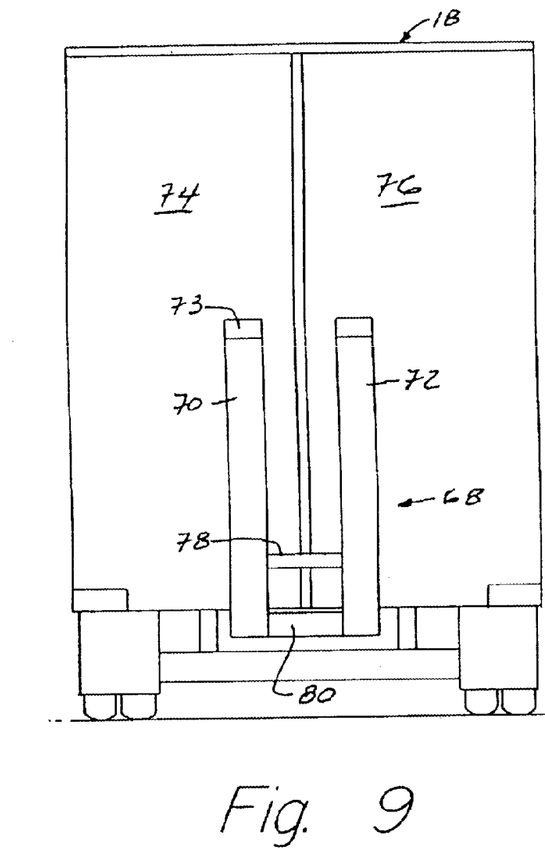
FIG. 9 is a rear elevational view of a truck trailer incorporating another embodiment of the invention wherein two air discharges are provided with the air channeler device, and constructed in accordance with the invention.
Figure 10:
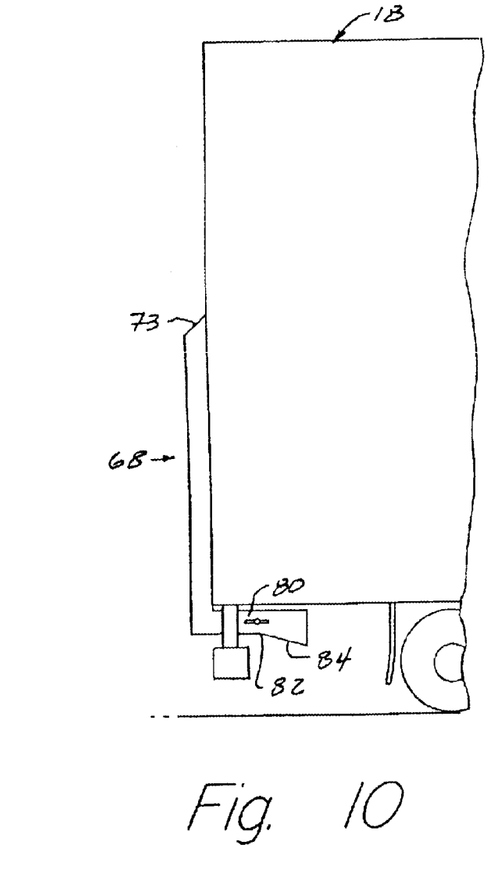
FIG. 10 is a side elevational view of the truck trailer and air channeler of FIG. 9.

FIGS. 9 and 10 show still another embodiment of the invention. As shown, an air channeler device 68 is mounted to the rear of the trailer 18 and is provided with two movable sections 70, 72, each mounted to the two laterally swinging cargo doors 74, 76 of the trailer 18. The discharge of sections 70, 72 are each located at a position as near as possible to the center of the rearward end of trailer 18. Because the sections 70, 72 are located laterally to either side of the center between cargo doors 74, 76, however, access to the centrally located locking mechanism 78 is provided. The movable sections 70, 72 of the conduit each engage a manifold 80 of the stationary section 82. An air scoop or inlet 84 is provided for introducing air into the channeler device 68. In the embodiment shown, the inlet 84 is located at a position behind the rear wheels of the trailer. Operation of the device 68 is generally the same as that described for air channeler 16.

Figures 11, 12:
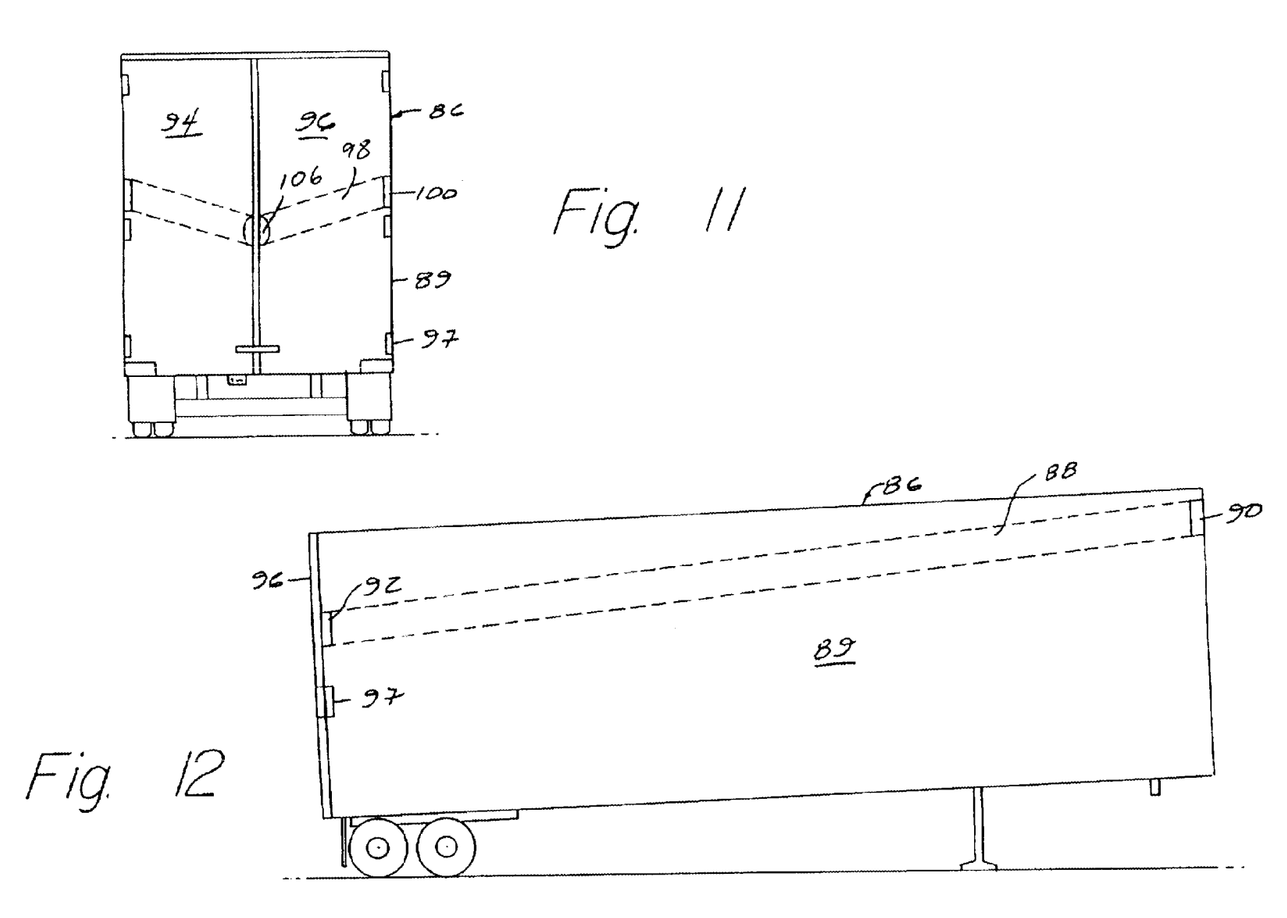
FIG. 11 is a rear elevational view of another embodiment of a truck trailer incorporating an integral air channeler, and shown constructed in accordance with the invention.
FIG. 12 is a side elevational view of the truck trailer of FIG. 11.

FIGS. 11 and 12 illustrate another embodiment of the invention wherein the channeler device is integral with the trailer 86. The walls of most tractor trailers, particularly those insulated trailers used for transporting refrigerated goods, have a sufficient thickness wherein an air channel or passageway 88 can be formed therein between the inner and outer skin of the sidewalls 89. The conduit 88 can be formed in each of the trailer sidewalls 89. As shown in FIG. 12, the conduit 88 has an air inlet 90 located at the upper forward portion of the trailer 86, although the inlet 90 could be located in other positions as well that are likely to encounter air flow. The passageway 88 extends the length of the trailer 86 and opens at discharge 92 located at the end edges of the sidewall 89.

Figure 13:
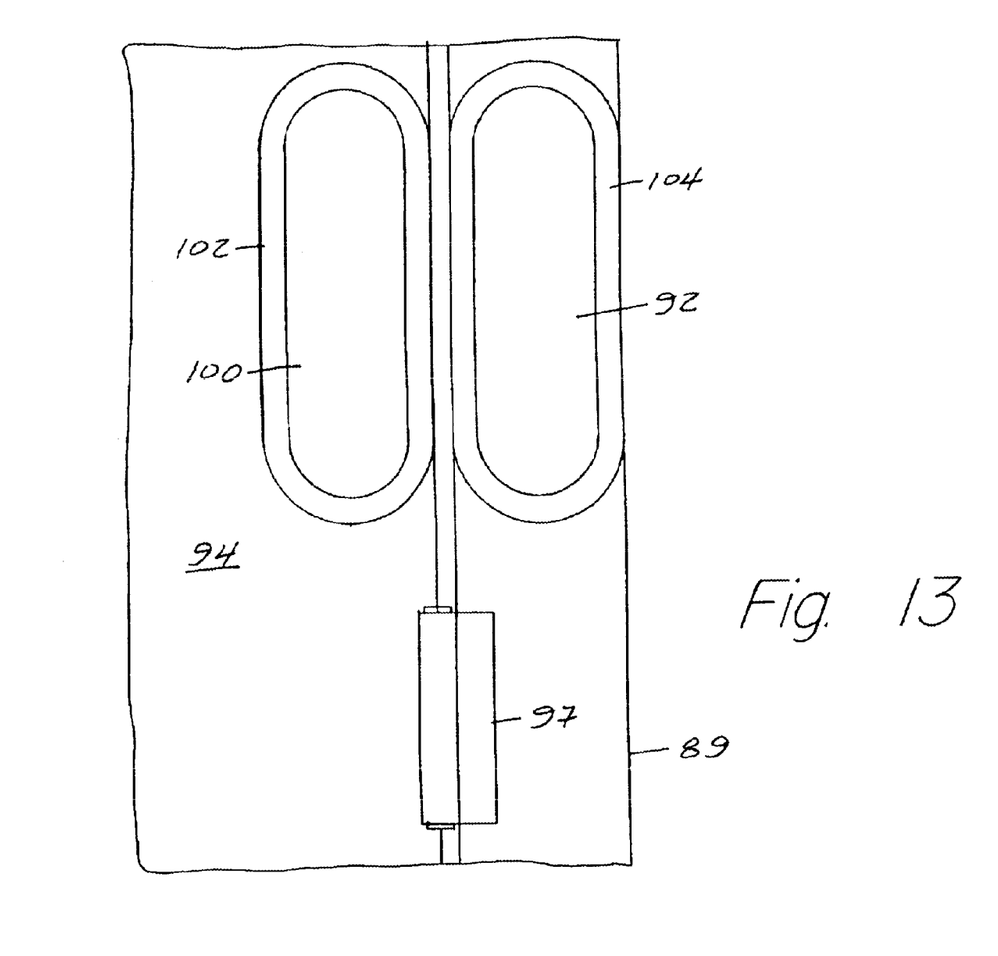
FIG. 13 is an elevational view of interfacing ports of a conduit of the air channeler of the truck trailer of FIG. 11, and shown constructed in accordance with the invention.

The trailer 86 is provided with laterally swinging cargo doors 94, 96 that are coupled to the sidewalls 89 of the trailer 86 by hinges 97. Formed in each of the cargo doors 94, 96 is a passageway or conduit 98. The cargo doors 94, 96 are similarly constructed to the sidewalls 89 and have a sufficient thickness to accommodate the conduit 98. An inlet 100 is formed in the portion of the doors 94, 96 that interface with the edges of sidewalls 89 so that the inlet 100 is in communication with discharge 92. As shown in FIG. 13, the inlet 100 is similarly configured and shaped to correspond to the discharge 92. Circumferential seals 102, 104 formed from a compressible material surround the discharge 92 and inlet 100 so that sealing engagement is achieved when the doors 94, 96 are closed.

The conduit 98 formed in the cargo doors 94, 96 extends the width of the doors and terminates in an air discharge 106. The discharge 106 is located as near the center of the rearward end of the trailer 86 as possible.

The operation of the air channeler device integrally formed with trailer 86 is similar to that of the channeler 16. When the doors 94, 96 are opened, the inlet 100 and discharge 96 disengage. When the doors 94, 96 are closed, the inlet 100 and discharge 96 engage to provide a continuous conduit for airflow to the discharge 106.

The invention has several advantages. The air channeler provides a means for reducing drag and aerodynamic resistance. This provides better fuel efficiency and greater gas mileage of most vehicles, which is important as fuel prices continue to rise and because of environmental concerns. In addition to greater fuel efficiency, because the air channeler disrupts the turbulent air flow behind the vehicle, improved stability, handling and safety of the vehicle are achieved. Maintenance costs are also reduced as wear on items such as wheel bearings and related components is decreased. Further, safety is also increased for those following or passing vehicles incorporating the air channeler of the invention than would otherwise occur in the wake of the same vehicle without the device. The device also improves or enhances acceleration or slowing of the vehicle, such as during braking operations, by providing a means for selectively opening and closing the air duct to decrease or increase drag.

The air channeler is simple in design, easy to install, can be manufactured and installed at low cost, and can be used on almost any vehicle without significant after-market modification. The device is less cumbersome than prior art designs and does not interfere with the normal operation the vehicle. The device can also be integrally incorporated with the vehicle.

The following example serves to further illustrate the invention.

EXAMPLE

An air channeler device was installed on a utility trailer of a tractor-trailer combination in a similar configuration to that shown in FIGS. 4 and 5. The device was formed from PVC pipe having a three-inch diameter, and utilized an air inlet having a six-inch diameter. After two consecutive calendar quarters, a second air channeler device of similar construction was employed with the same tractor unit, in a similar configuration to that shown in FIG. 8. Gas mileage statistics both with and without the air channeler devices are presented in Table 1 below.

TABLE 1

| Quarter | Year 1 Gal @ Mile/Gal | Year 2 Gal @ Mile/Gal | Year 3 Gal @ Mile/Gal | Year 4 Gal @ Mile/Gal | Year 5 Gal @ Mile/Gal |
|---|---|---|---|---|---|
| 1$^{st}$ Qtr. | 38,837 @ 5.80 | 35,329 @ 5.71 | 38,125 @ 5.15 | 33,835 @ 5.05 | 28,588 @ 6.16* |
| 2$^{nd}$ Qtr. | 42,594 @ 5.85 | 37,296 @ 5.60 | 37,519 @ 5.65 | 38,217 @ 5,78 | 33,068 @ 6.72* |
| 3$^{rd}$ Qtr. | 36,281 @ 5.57 | 31,694 @ 6.06 | 29,781 @ 5.77 | 34,753 @ 5.75 | — |
| 4$^{th}$ Qtr. | 33,752 @ 5.94 | 36,841 @ 5.95 | 35,173 @ 6.00 | 31,600 @ 6.09* | |

*Air channeler installed.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. An air channeler device for use with a body having a forward and rearward end that locates within an air stream for reducing wind resistance of the body, the device comprising:

an air inlet for positioning within an air stream surrounding the body so that air is received in the inlet as the air stream moves about the body;

an air discharge for positioning at a generally central location of the rearward end of the body and having a width that is substantially less than the width of the rearward end of the body so that the air discharge is spaced inward from the edges of the rearward end; and an air conduit that couples to the body and has a generally tubular passageway that is in communication between the air inlet and the air discharge for directing air from the air inlet through the conduit to the discharge, the air conduit being formed in at least two sections that are releasably joined together so that the at least two sections can be engaged and disengaged from one another.

2. The air channeler device of claim 1, wherein:

one of the at least two sections is adapted for coupling to a movable portion of the body that is movable between first and second positions and wherein movement of the movable portion between the first and second positions causes engagement and disengagement of the at least two sections.

3. The air channeler device of claim 1, further comprising:

a seal joined to at least one of the two sections of the air conduit for providing sealing engagement of the two sections of the air conduit when engaged with one another.

4. The air channeler device of claim 1, further comprising:

an air damper movable between open and closed positions for selectively closing off the air conduit to prevent air flow through the passageway.

5. The air channeler device of claim 1, wherein:

the width of the air discharge is substantially less than the distance of the air discharge from the side edges of the rearward end of the body.

6. The air channeler device of claim 1, wherein:

the air inlet and air discharge include opposite ends of the air conduit.

7. The air channeler device of claim 1, further comprising:

a coupling device for coupling the air conduit to the body.

8. The air channeler device of claim 1, wherein:

the air discharge has a width of about 12 inches or less.

9. In a vehicle having a forward and a rearward end, an air channeler device for reducing wind resistance of the vehicle, the device comprising:

an air inlet for positioning within an air stream surrounding the vehicle so that air is received in the inlet as the vehicle is moved in a forward direction;

an air discharge located at a generally central location of the rearward end of the vehicle and having a width that is substantially less than the width of the rearward end of the vehicle so that the air discharge is spaced inward from the edges of the rearward end; and an air conduit mounted to the vehicle and that has a generally tubular passageway that is in communication between the air inlet and the air discharge for directing air from the air inlet through the conduit to the discharge, the air conduit being formed in at least two sections that are releasably joined together so that the at least two sections can be engaged and disengaged from one another.

10. The air channeler device of claim 9, wherein:

one of the at least two sections is mounted to a movable portion of the vehicle that is movable between an open and closed position and wherein movement of the movable portion between the open and closed position causes engagement and disengagement of the at least two sections.

11. The air channeler device of claim 9, further comprising:

a seal joined to at least one of the two sections of the air conduit for providing sealing engagement of the two sections of the air conduit when engaged with one another.

12. The air channeler device of claim 9, further comprising:

an air damper movable between open and closed positions for selectively closing off the air conduit to prevent air flow through the passageway.

13. The air channeler device of claim 9, wherein:

the width of the air discharge is substantially less than the distance of the air discharge from the side edges of the rearward end of the vehicle.

14. The air channeler device of claim 9, wherein:

the air inlet and air discharge include opposite ends of the air conduit.

15. The air channeler device of claim 9, wherein:

the air discharge has a width of about 12 inches or less.

16. An air channeler device for use with a vehicle having a forward and rearward end for reducing wind resistance of the vehicle, the device comprising:

an air inlet for positioning within an air stream surrounding the vehicle so that air is received in the inlet as the vehicle is moved in a forward direction;

an air discharge for positioning at the rearward end of the vehicle; and an air conduit that couples to the vehicle and has a generally tubular passageway that is in communication between the air inlet and the air discharge for directing air from the air inlet through the conduit to the discharge, the air conduit being formed in at least two sections that are releasably joined together so that the at least two sections can be engaged and disengaged from one another; and wherein one of the at least two sections is adapted to be mounted to a movable portion of the vehicle that is movable between first and second positions and wherein movement of the movable portion between the first and second positions causes engagement and disengagement of the at least two sections.

17. A method of reducing wind resistance of a body having a forward end and a rearward end that is located in an air stream comprising:

positioning an air inlet within an air stream surrounding the body so that air is received in the inlet as the air stream moves about the body;

providing an air discharge at a generally central location of the rearward end of the body, the air discharge having a width that is substantially less than the width of the rearward end of the body so that the air discharge is spaced inward from the edges of the rearward end; and allowing air to pass through an air conduit having a generally tubular passageway that is in communication between the air inlet and the air discharge so that air is directed from the air inlet through the conduit to the discharge; and wherein the air conduit is formed in at least two sections that are releasably joined together so that the at least two sections can be engaged and disengaged from one another; and wherein one of the at least two sections is adapted to be mounted to a movable portion of the body that is movable between first and second positions and wherein movement of the movable portion between the first and second positions causes engagement and disengagement of the at least two sections.

* * * * *